UNITED STATES PATENT OFFICE.

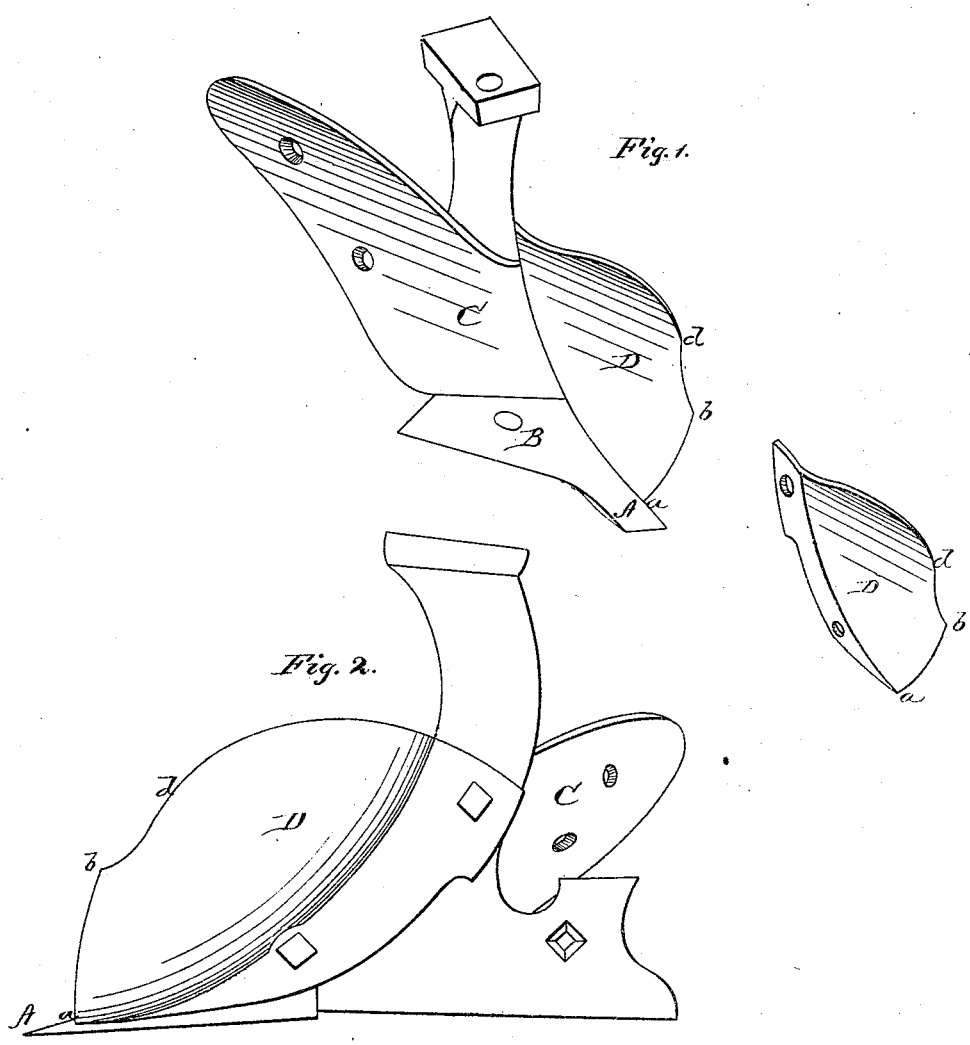

JAMES R. HARRIS, OF HAZLEHURST, MISSISSIPPI.

IMPROVEMENT IN PLOWS.

Specification forming part of Letters Patent No. 132,828, dated November 5, 1872.

*To all whom it may concern:*

Be it known that I, JAMES R. HARRIS, of Hazlehurst, in the county of Copiah and in the State of Mississippi, have invented certain new and useful Improvements in Scraper Attachments for Plows; and do hereby declare that the following is a full, clear, and exact description thereof, reference being had to the accompanying drawing and to the letters of reference marked thereon making a part of this specification.

My present invention is intended as an improvement upon the "scraper attachment for plows" for which Letters Patent were granted to me June 25, 1872; and it consists in the construction of the scraper and its arrangement on the plow, as will be hereinafter more fully set forth.

In order to enable others skilled in the art to which my invention appertains to make and use the same, I will now proceed to describe its construction and operation, referring to the annexed drawing, in which—

Figure 1 is a perspective view of my plow and scraper, and Fig. 2 is a side view of the same from the land-side.

A represents the plow-point, B the share, and C the mold-board, of an ordinary plow. D is the scraper attached to the same.

In my former patent above referred to the point of the scraper is located in advance of the plow-point, and, in practice, the point of the scraper operates beneath the surface of the ground, and the top edge of the scraper rises gradually to the standard of the plow, presenting no angle upon which weeds or grass could accumulate and clog the scraper. That not cut by the top edge of the scraper passes over the same. In the present case the same feature in the mode of operation is preserved, except that the scraper D presents the cutting-edge *a b d* behind the plow-point A, and still an inch and a half or two in advance of the cutting-edge of the plow-share B. The cutting-edge *a b d* is of peculiar form, as shown. From *a* to *b* the edge is slightly convex, rising and extending outward, and from *b* to *d* the edge is concave.

In operating, the angle of the scraper at *b* runs beneath the surface of the ground, and any grass or weeds which may be there embedded will be cut and not clog the edge. From *b* to *d* is a continuation of the cutting-edge, and grass or weeds on or near the surface of the ground, if not cut by it, will pass over, there being no angle to arrest the same.

There are scrapers similar to mine which turn up at the outer angle, and others which have a bow-shaped cutting-edge, both kinds operating with the outer angles above the surface of the ground, and, while objectionable on other grounds, are particularly so on this account, because these outer angles will arrest grass and weeds and thus clog the cutting-edge, and require constant stopping and cleaning, which is a serious objection to their usefulness. My improvement overcomes this objection, and produces better work than those now in use.

Having thus fully described my invention, what I claim as new, and desire to secure by Letters Patent, is—

The scraper D, having the cutting-edge slightly convex from *a* to *b* and concave from *b* to *d*, combined with a plow, substantially as and for the purposes herein set forth.

In testimony that I claim the foregoing I have hereunto set my hand this 17th day of September, 1872.

JAMES R. HARRIS.

Witnesses:
C. L. EVERT,
A. N. MARR.